United States Patent [19]
Bacon et al.

[11] Patent Number: 4,996,825
[45] Date of Patent: Mar. 5, 1991

[54] COMBINED BLOUSING, STRIPPING AND SEALING FOR BAG FORMING AND METHOD

[75] Inventors: Forrest C. Bacon; William A. Hadden, both of Conyers, Ga.

[73] Assignee: Kliklok Corporation, Decatur, Ga.

[21] Appl. No.: 304,315

[22] Filed: Jan. 31, 1989

[51] Int. Cl.$^5$ .............................. B65B 9/08; B65B 9/10
[52] U.S. Cl. ........................................ 53/451; 53/551; 53/374.8
[58] Field of Search ................. 53/451, 551, 552, 554, 53/66, 75, 373, 469

[56] References Cited

U.S. PATENT DOCUMENTS

| | | | |
|---|---|---|---|
| 3,027,695 | 4/1962 | Leasure | 53/451 |
| 3,256,673 | 6/1966 | Tew et al. | 53/551 |
| 3,543,468 | 12/1970 | Leasure | 53/451 |
| 3,548,563 | 12/1970 | Leasure | 53/451 |
| 3,616,087 | 10/1971 | Henry et al. | |
| 3,685,250 | 8/1972 | Henry et al. | 53/551 |
| 4,077,308 | 3/1978 | Scully | 53/552 X |
| 4,215,520 | 8/1980 | Heinzer et al. | 53/552 X |
| 4,265,074 | 5/1981 | Reuter et al. | 53/551 |
| 4,291,520 | 9/1981 | Prince et al. | |
| 4,495,748 | 1/1985 | Rowell | 53/451 X |
| 4,537,012 | 8/1985 | Groom et al. | 53/552 |
| 4,563,862 | 1/1986 | McElvy | 53/552 |
| 4,599,850 | 7/1986 | Kopp | 53/451 |
| 4,751,808 | 6/1988 | Hadden | 53/551 X |
| 4,757,668 | 7/1988 | Klinkel et al. | 53/551 X |
| 4,768,327 | 9/1988 | Mosher | 53/451 |

Primary Examiner—Horace M. Culver
Attorney, Agent, or Firm—King & Schickli

[57] ABSTRACT

A combined blousing, stripping and sealing operation is disclosed for providing increased speed and efficiency to a form, fill and seal packaging system. An AC/DC brushless servo motor is utilized for driving the stripping/sealing carriage, as well as operating the sealing jaws to form the bags from a continuous film tube. Each servo motor drives a crank that is coupled for oscillating movement in response to a programmable index controller. Drive linkage connects the crank to the carriage/sealing jaws. The blousing function is provided by a pair of plates on the top of the sealing jaws. On the return movement of the carriage, the plates contact the bottom of the bag next in line to bulge the sides for receipt of the product. The programmable index controller provides a signal to the carriage/sealing jaws in dependence on an external signal indicative of the selected bag size being packaged.

17 Claims, 4 Drawing Sheets

COMBINED BLOUSING, STRIPPING AND SEALING FOR BAG FORMING AND METHOD

BACKGROUND OF THE INVENTION

The present invention relates to the field of form, fill and seal packaging systems, and more particularly, to an improved product stripper/bag sealing operation and/or bag blousing operation that may be used in conjunction therewith, and all of which may be computer controlled for forming different size bags for maximum packaging speed.

Machines and related methods for forming, filling and sealing of packages made from a continuous film are widely used to package a variety of loose products, such as snack foods, frozen foods and the like. These machines typically comprise a supply of packaging film in the form of a web, a former for converting the web of film into a continuous hollow tube and reciprocating jaws for stripping, sealing and cutting the tube into a consecutive series of filled packages, sometimes referred to as pillow-shaped bags. One of the most successful approaches for stripping/sealing calls for mounting of the reciprocating stripping/sealing jaws on a carriage that is driven for movement in the direction of the bag forming.

The sealing jaws in this typical packaging machine/method are brought together in two steps. The first step closes the jaws just sufficiently to bring the stripper plates, which are mounted below the sealing jaws, into engagement to flatten the package film tube. The stripper plates are moved in the longitudinal direction along the tube and relative to the film in order to strip any product from the zone of the tube to be subsequently sealed. The second step completes the closing of the bag by bringing the sealing jaws together to form the seal and to cut the leading bag from the tube.

After each bag is formed, the jaws are typically moved away from the film tube and in the reverse feed direction back to the home position in readiness for producing the next bag from the continuous film tube.

One of the primary areas of recent development in packaging for today's snack food industry is machine enhancement for increased speed of operation of this type of form, fill and seal packaging system. With the increased speed, there is also a demand among users for the machine to be even more efficient in terms of energy use and machine reliability. In response to these demands, new systems for improved feeding of the packaging film by the use of computer controlled stepper motors has been developed, as set forth in the U.S. Pat. No. 4,727,707, issued Mar. 1, 1988, and assigned to the same assignee as the present invention. The feeding of the film is maximized in terms of speed and efficiency and can be controlled in order to adapt the machine for an infinite variety of bag sizes. The film feed is maximized further in terms of speed and efficiency by constantly accelerating the film over the first half of the driving time and constantly decelerating the film over the remaining half. These features, along with others, provide a substantial amount of the increase in the efficiency and speed of the operation and, indeed, have been effective in obtaining substantial acceptance among the industry. The endless belt/stepper motor film drive is employed as the preferred approach in the present invention also.

In order to obtain even greater film feeding efficiency and speed, the next step turned out to be controlling the in and out movement of the stripper and sealing jaw apparatus on the machine. There has now been a successful approach for increasing the machine speed by limiting this movement to just the amount needed for a particular bag size. By use of a preferred servo motor and programmable index controller circuit, the packaging machine can be programmed to operate at the increased speed and efficiency over a broad range of bag sizes. In essence, the stripper/sealing jaws move with respect to the film tube only in the amount necessary to perform their operation on that particular bag and, thus, eliminate all unnecessary movement. This, in effect, compresses the time cycle for packaging. Furthermore, this has been accomplished for a new minimum cost of manufacturing while assuring the lowest energy cost and greatest reliability. This apparatus/method is disclosed and claimed in prior U.S. Pat. No. 4,751,808, issued June 21, 1988.

Many in the industry feel that with the development of the improved packaging operation brought about by the two foregoing advances in the art that the optimum operation speed and efficiency has finally been attained. However, I have recently discovered that additional advances are possible in the area of stripping/sealing of the bag as it is formed. More specifically, the improvement is possible in the area of controlled driving of the movable carriage which performs the stripping and sealing operation. Furthermore, my discovery has included using the movable carriage for assisting the bag filling function which has heretofore not been considered or discovered.

SUMMARY OF THE INVENTION

Accordingly, it is the first object of the present invention to provide a stripper and sealing jaw system and related method that has even greater efficiency and speed in order to complement the advances of the prior art and to take full advantage of the increased speed of the state-of-the-art film feeding technology.

It is another object of the present invention to provide an apparatus and method for combined blousing, stripping and sealing of continuous film to form a package that is adaptable to a broad range of bag sizes without requiring a mechanical adjustment or change of the carriage or any other parts of the machine.

It is another object of the present invention to provide an apparatus and method for blousing/stripping/sealing that minimizes the length of carriage drive along the longitudinal direction of the film movement, and is selected according to bag size to maximize packaging speed and efficiency.

It is still another object of the present invention to provide a new packaging system that provides for precise control of the stripping/sealing and forming of the bag in order to minimize the operation time for any given size bag being formed.

It is still another object of the present invention to provide a movable carriage in a packaging machine adapted for stripping and sealing of the continuous film into individual bags in an improved fashion with increased speed and efficiency.

It is still another object of the present invention to provide a stripper/sealing apparatus and method that utilizes carriage movement operated in a positive fashion by a servo motor and associated drive linkage to allow for precise control to match bag sizes in response to a programmable controller.

It is still a further object of the present invention to provide a stripper/sealing and/or blousing apparatus and method that is operative for maximum speed and efficiency in response to an external signal from a programmable controller or the like indicative of the selected bag size being packaged.

It is still a further object of the present invention to provide a method of forming a bag including blousing of the bag to facilitate the filling operation and thereby maximize packaging speed and prevent puncturing of the bag being formed.

Additional objects, advantages and other novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

Accordingly, to achieve the foregoing and other favorable objects, and in accordance with the purposes of the present invention now known and described herein, an improved apparatus is provided for forming a continuous package film tube into a succession of bags with maximum speed and efficiency. In particular, the efficiency is such as to match the increased efficiency made possible by the improvement in film feeding technology, as represented in the aforesaid U.S. Pat. No. 4,727,707 and to add an additional dimension to the improved speed and efficiency accomplished in the aforesaid U.S. Pat. No. 4,751,808. The present invention takes advantage of specifically programming the driving of the stripper/sealing jaw carriage in the direction of the movement of the film tube in order to match each bag size being formed. Further, the extra dimension is added of using the sealing jaws to blouse the bag so that hard-to-fill product readily enters the bag to further maximize packaging speed and prevent puncturing of the bag.

Thus, in accordance with the preferred embodiment of my present invention, a combined blousing, stripping and sealing apparatus for packaging product in a bag formed from a continuous film tube in a form, fill and seal packaging machine is provided. The apparatus includes a carriage, means for driving the carriage in a longitudinal direction along the tube and sealing jaw means mounted on said carriage for in and out movement between closed and open positions at the proper and controlled times. The sealing jaw means includes blousing means for bulging the sides of the bag to provide the assist in receiving the product, which is also similarly controlled for the maximum speed and efficiency.

The moving means for the stripper/sealing jaw means provides movement in a first direction toward the closed position for blousing, stripping and sealing and in a second direction toward the open position to release the formed bag. A programmable controller operates both the driving means for the carriage and the moving means for the jaw means in accordance with the preprogrammed commands according to the bag size being packaged. As a result, the blousing, stripping and sealing are all performed in a precise manner according to the bag size to maximize packaging machine speed.

The computerized control of the moving carriage in this manner provides an important factor in allowing the manufacturer to build a standard machine to serve the desired broad range of bag sizes. The stripping movement along the packaging tube is limited to the amount known to be necessary for efficient operation of the machine for the particular selected bag. For a large bag, the stripping movement is greater and thus requires more time than for a small bag. Thus, the packaging operation/method can be compressed for smaller bags increasing the speed while maintaining full efficiency of assuring that the sealing area is free of product. Furthermore, the speed and efficiency for filling larger bags is also optimized since the precise amount needed can be controlled. There are no mechanical parts involved in changing the operation of the carriage to change the bag size. Instead, this is simply accomplished by a change in the program of the control means.

The driving means preferably includes a servo motor and a crank coupled to the motor for oscillating movement. A simple drive linkage, such as an adjustable connecting rod, connects the crank to the carriage to provide the longitudinal movement along the tube. This movement provides the blousing operation of the bag by freely lifting the bottom of the bag on the upstroke, that is movement opposite to that of bag forming, and performs the stripping operation on the bag on the downstroke, that is upon movement in the direction for bag forming. A programmable controller including a microprocessor and keyboard for inputting new information is preferably provided for operating the servo motor. Once a particular bag size information is inputted into the controller, that bag size can be automatically recalled and the packaging operation reinitiated with virtually no down time.

The blousing means preferably comprises a pair of plates on the top of the sealing jaws for direct contact with the bottom of the bag being filled. After the stripping operation is performed and the sealing jaws closed to form the seal of the bag, the carriage is driven upwardly by the servo motor while the bottom of the bag is being held. This causes a bulge in the sides of the bag. There is no internal mandrel in the bag so that the procedure contemplates freely lifting of the bag and allowing the bottom of the bag to engage the blousing plates and spread out to form the bulge.

The blousing operation is most useful in a bag forming procedure to speed up the packaging operation where hard-to-fill product is involved. A typical product of this nature is elongated pretzel sticks that must be placed in a bag as a group in a substantially vertical orientation (along the longitudinal axis of the bag). The blousing of the bag provides a fuller open space in the bottom of the bag to facilitate entry and settling in the bottom. Furthermore, since the bottom of the bag is relaxed and open, the pretzel sticks are not prone to puncture the bottom of the bag as they drop into position. In the preferred embodiment, the bag is held in the bloused position during the complete filling step in order to bring about the desired results. There is not additional time required for blousing since this is simply accomplished on the return stroke of the carriage to the home position for the next stripping/sealing operation. Preferably, the length of the stripping movement is substantially the same as the lifting movement for blousing. This length of stripping and lifting is controlled in accordance with the bag size in order to maximize packaging speed.

Of course, in accordance with the broader aspects of the present invention, when it is desired to provide stripping and/or sealing of a bag in a size and with a product that does not require blousing, the principles of stripping/sealing described above can be utilized independently. In either case, the control of the driving means is programmed according to the bag size thereby assuring full compression of the bag forming time required.

Still other objects and advantageous results of the present invention will become readily apparent to those skilled in this art from the following more detailed description wherein there is shown and described a preferred embodiment of this invention simply by way of illustration of one of the modes best suited to carry out the invention. As it will be realized, the invention is capable of other different embodiments and its several details are capable of modifications in various obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrates several aspects of the present invention, and together, with the description serve to explain the primary principles of the invention. In the drawings.

Reference will now be made in detail to the present preferred embodiment of the invention, an example of which is illustrated in these drawings.

DETAILED DESCRIPTION OF THE INVENTION

Figures 1, 1A:
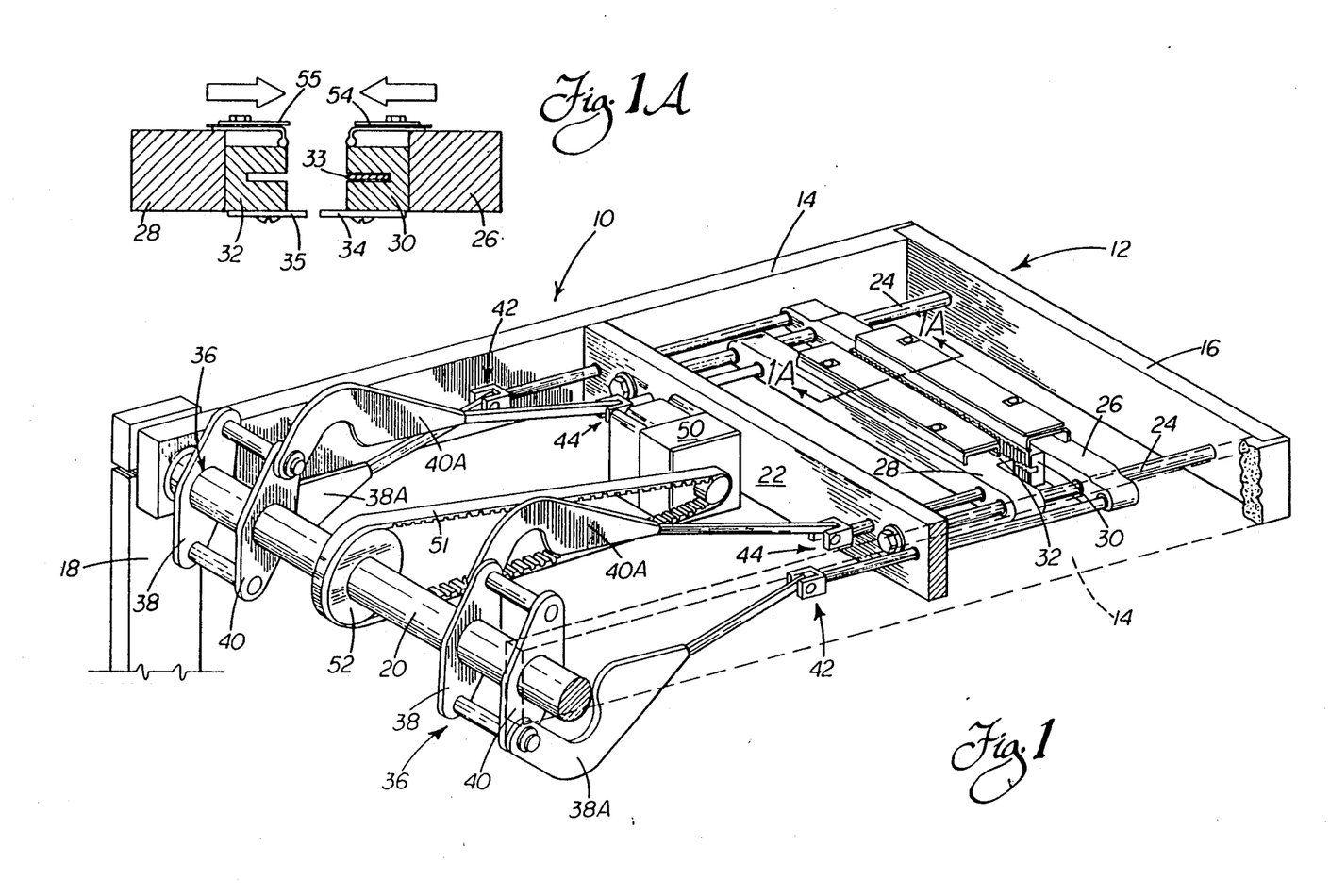
FIG. 1 is a perspective view of the combined blousing, stripping and sealing apparatus of the present invention with one side rail broken away and shown in phantom for clarity.
FIG. 1A is a cross-sectional view taken along the line 1A—1A in FIG. 1 and illustrating the sealing jaws and the attached stripper plates and blousing plates.
Figure 2:
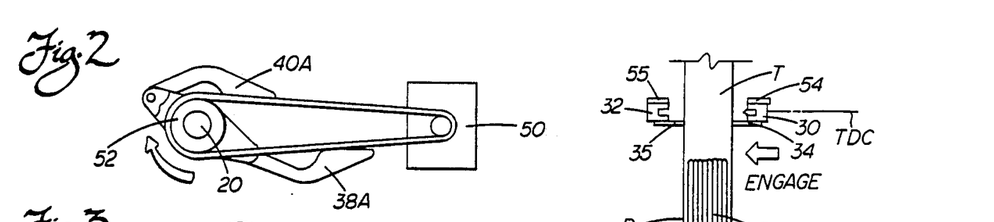
FIGS. 2-7 are schematic illustrations of the moving means for the stripper/sealing jaw arrangement, and with the strippers/sealing jaws/blousing plates and the film tube shown in the corresponding positions.
Figure 3:
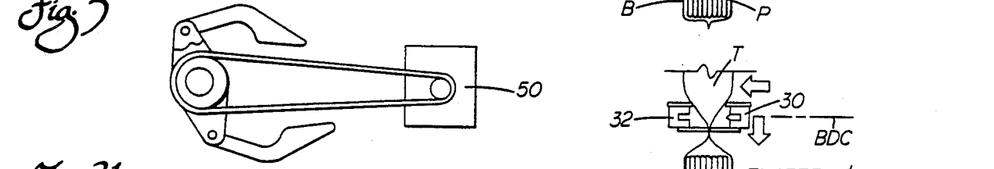
Figure 8:
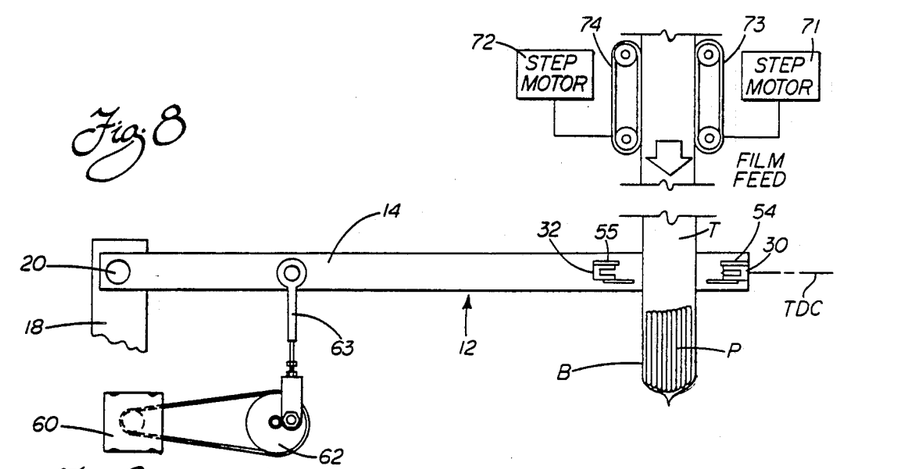
FIGS. 8-12 are also sequential showings of the strippers/sealing jaws and blousing plates in combination with the film tube, but with the carriage mounting the sealing jaws and with the drive means for the carriage shown schematically.

Reference is now made to the perspective view of FIG. 1 showing the improved combined blousing, stripper and sealing apparatus 10 for use in packaging product in a bag B formed from a continuous film tube T (see also FIGS. 2 and 8). The carriage, generally designated by the reference numeral 12, includes a pair of side rails 14 and a front cross rail 16. A support frame 18 forms a part of the packaging machine and receives an oscillating drive shaft 20. As can be seen in detail in FIGS. 8-12, the carriage 12 oscillates up and down along the tube T. In order to allow the oscillating motion of the shaft 20, as well as the oscillating movement of the carriage 12 to occur at the same time, it is clear that the shaft 20 is journaled for rotation in the support frame 18, and the carriage 12 is journaled for separate rotation At the forward end of the carriage 12 fixedly positioned between the front cross rail 16 and intermediate cross piece 22 are mounted two guide rods 24. Supported for sliding motion along the guide rods 24 are a pair of support blocks, 26, 28 that carry sealing jaws 30, 32, respectively. As best shown in FIG. 1A, one of the sealing jaws 30 includes a cut-off knife 33 operable in a known fashion to cut and release each formed bag B in the proper timed sequence. Mounted below the two sealing jaws 30, 32 are slidable stripper plates 34, 35. These stripper plates are spring loaded to their extended position (see FIG. 1A) in a manner well known in the art. In the extended position shown in FIG. 1A, the plates are in a position to fully engage the film tube T (not shown in this figure) and strip the product from the seal area prior to the final movement of the sealing jaws 30, 32 together for sealing.

Mounted on the oscillating drive shaft 20 are a pair of bell crank assemblies 36. Each of the assemblies includes two bell cranks 38, 40 and pivotally attached to each of the bell cranks is a corresponding drive arm 38a, 40a. Attached to each of the outside drive arms 38a is a drive linkage, generally designated by the reference numeral 42. Similarly, attached to each of the inside drive arms 40a is a drive linkage 44. The drive linkages 42, 44 are operative to move the sealing jaw support blocks 26, 28 toward and away from each other to form the stripping/sealing operation. This is more fully explained in the issued U.S. Pat. No. 4,751,808, which is hereby incorporated by reference.

Figure 13:
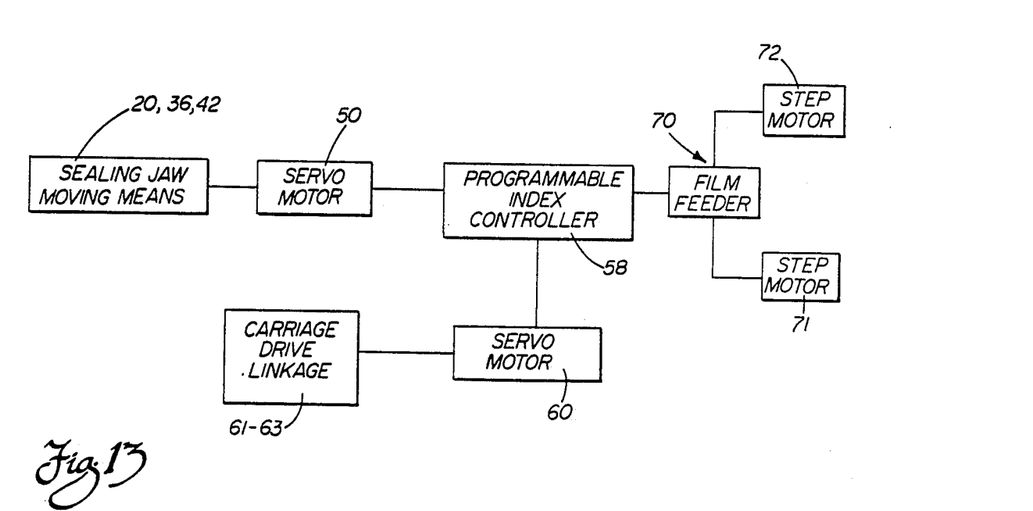
FIG. 13 is a schematic block diagram showing the control circuit of the blousing, stripping and sealing apparatus of the present invention.

The oscillating drive shaft 20 is driven by an AC/DC brushless servo motor 50. The output shaft of the motor 50 engages a drive belt 51 that in turn operates a matching gear 52 on the drive shaft 20. As shown in FIG. 13, the servo motor 50 is controlled by a programmable index controller 58.

Mounted on top of the sealing jaws 30, 32 (see FIG. 1A) are a pair of blousing plates 54, 55. As illustrated, these plates are spaced from the sealing jaws 30, 32 in order to remain substantially insulated therefrom. The air circulating under the plates 54, 55 keeps them relatively cool to allow engagement with the bottom of each formed bag, in a manner that will be presently apparent. Unlike the stripper plates 34, 35, the blousing plates 54, 55 are not spring loaded and are positioned so as to be slightly spaced from each other to accommodate the thickness of the packaging tube without tightly engaging the same.

With reference to FIGS. 8-12, another important aspect to the present invention can be more clearly seen. Another AC/DC brushless servo motor 60 is shown for driving the carriage 12 by way of drive belt 61, crank 62 mounted on the frame 18 and drive linkage 63, which takes the form of an adjustable connecting rod between the crank 62 and the carriage 12. As shown in these figures, the carriage 12 is thus being driven to provide longitudinal movement along the tube T for blousing, stripping and sealing (as will be described in more detail below). As can be seen in FIG. 13, the servo motor 60 is also controlled by the index controller 58.

The schematic diagram of FIG. 13 also illustrates the interconnection of the programmable index controller 58 with film feeder 70, including two stepping motors 71, 72. As illustrated in FIG. 8, the stepping motors 71, 72 operate feed belts 73, 74 held in engagement with the packaging tube T and operated in order to quickly and efficiently feed the film upon demand. The full mode of operation of the film feeding is covered in the previous U.S. Pat. No. 4,727,707, mentioned above.

As will now be apparent, and by viewing FIG. 13, the programmable index controller 58 is the heart of the operating system of the combined blousing, stripping and sealing apparatus of the present invention. The controller 58 includes a microprocessor and an input device, such as a keyboard, for providing the programming information (not shown). The microprocessor preferably includes an STD compatible 16 bit base computer, such as Cubit Model 8600 with a servo motor controller card, such as a Tech 80, Model 4322 and amplifier, such as Imec 400. The preferred compatible motor may be a Pacific Scientific RA6 SENA-TD-ED-NV-02. As configured, the circuit is capable of controlling all functions and repeating all movements required for any bag size that is entered into the memory. By providing a central controller 58 as described, there can be full coordination between all functions of film feeding/stripping/sealing; as well as, blousing of the bag, if necessary.

To provide a fuller description of the operation and related method of the present invention, reference should now be made to FIGS. 2-7. These figures represent schematic illustrations of the combined blousing/stripping/sealing apparatus 10 with the drive arms 38a, 40a positioned in response to the servo motor 50 in the proper relative position (see left side of Figures). On the right is shown the corresponding position of the sealing jaws 30, 32, stripper plates 34, 35 and blousing plates 54, 55; the drive linkages 42, 44 being omitted for clarity.

Thus, in FIG. 2, the servo motor 50 is actuated and the drive arms 38a, 40a are shown moving (note Action Arrow) to effect closing of the sealing jaws 30, 32 with the stripper plates 34, 35 just engaging the packaging film tube T. Product P is positioned in the bottom of first in-line bag B. Upon further actuation of the servo motor 50 and as the carriage 12 is in position at top dead center (TDC), the arms are operative to bring the stripper plates 34, 35 into full contact to flatten the tube T. While flattened, the stripping function is also performed (see Action Arrows of FIG. 3 as the carriage 12 moves to bottom dead center (BDC)). Once the stripping is completed, the sealing jaws 30, 32 are brought into full contact by further actuation and movement of the drive arms 38a, 40a in response to the servo motor 50. This action also brings the blousing plates 54, 55 into full engagement, as shown in FIG. 4.

Figures 4, 5:
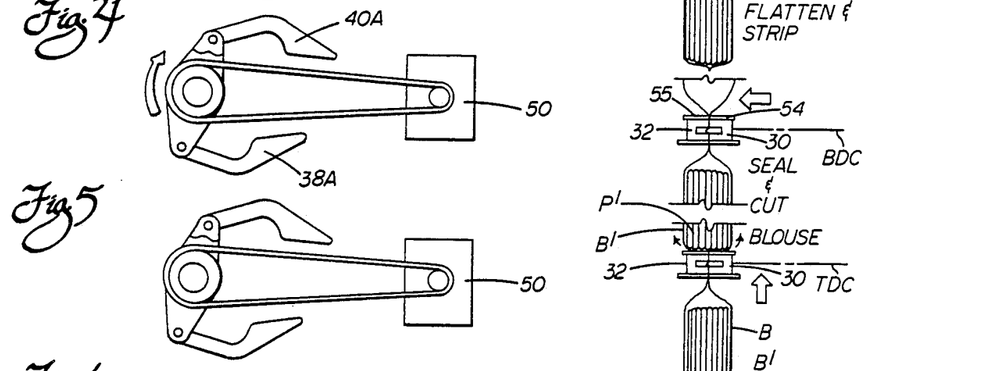
Figure 6:
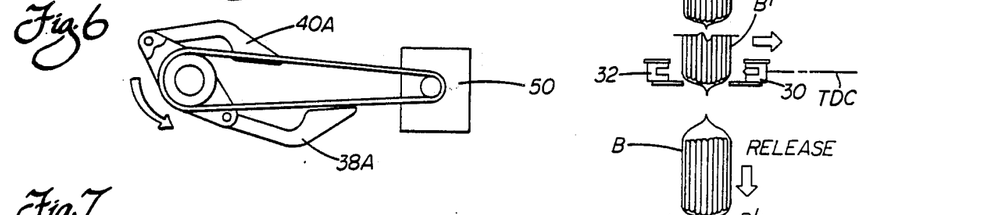

In FIG. 5, while the drive arms 38a, 40a are maintained in the same position, the tube T can now be bloused by moving the sealing jaws back to the TDC position. The product P', as shown in this figure, can be dropped into this next bag B' while bloused open. In the following FIG. 6, the drive arms 38a, 40a are moved in the opposite direction to now open the sealing jaws 30, 32 and release the finished bag B; having been cut by the knife 33.

Figure 7:
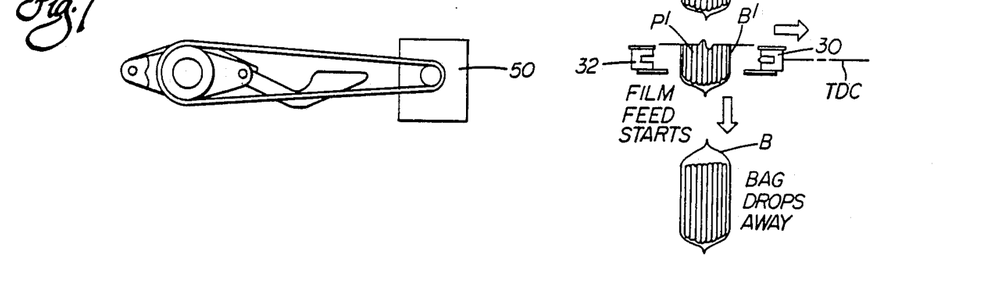

Finally, the sealing jaws 30, 32 withdraw to the full open position by further operation of the servo motor 50 in accordance with the programmed information in the controller 58. The film feed for the tube T is initiated bringing the next bag B' with the product P' in position for repeating the packaging cycle.

The stopping of the sealing jaws 30, 32 without requiring full opening is an important aspect in combination of the present invention and as more fully described in the prior U.S. Pat. No. 4,751,808. The tube T and bags B, B' may be considered representative of the large size bags; it being understood that the sealing jaw positions of FIGS. 2 and 7 are infinitely adjustable to accomplish the minimum opening for any size bag. All that is necessary is the reprogramming of the controller 58. Substantial time during the packaging cycle is saved with this feature For a small bag, the jaws 30, 32 open only a small amount; whereas for larger bags, the jaws 30, 32 retract by just the amount of additional space required for clearance of the tube T during film feeding.

As the packaging cycle is completed, the finished bag B drops away, and the next packaging cycle begins. To denote this, the same positioning with the jaws 30, 32 at top dead center is shown in both FIGS. 2 and 7 of the drawings.

FIGS. 8-12 provide a closer look at the means for driving the carriage 12 in the longitudinal direction along the tube T, as well as the method related thereto which forms another important feature of the present invention.

Thus, as seen in FIG. 8, the servo motor 60 is operative to drive the crank 62 for operating the linkage 63 and thereby oscillating the carriage 12. In this figure, the sealing jaws 30, 32 are withdrawn at TDC position and the film tube T passes through by feeding action from the endless belts 73, 74 above. As previously described, the stepping motors 71, 72 drive the belts in response to the controller 58.

Figure 9:
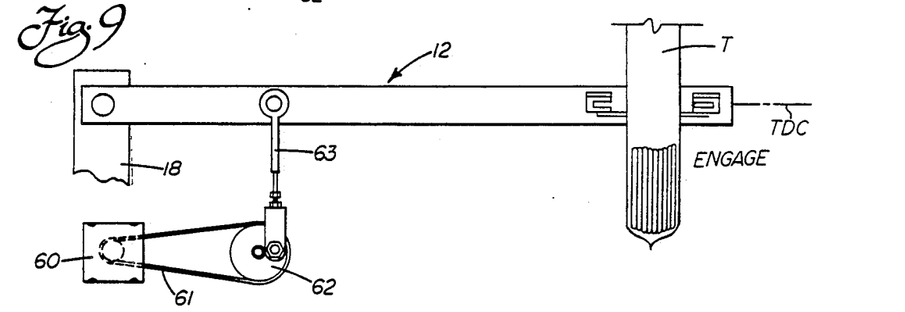

FIG. 9 shows the sealing jaws 30, 32 moving into position to engage the film tube T and with the servo motor 60 still not activated so that the carriage remains at TDC or home position. This showing corresponds generally to the similar showing in FIG. 2 above.

Figure 10:
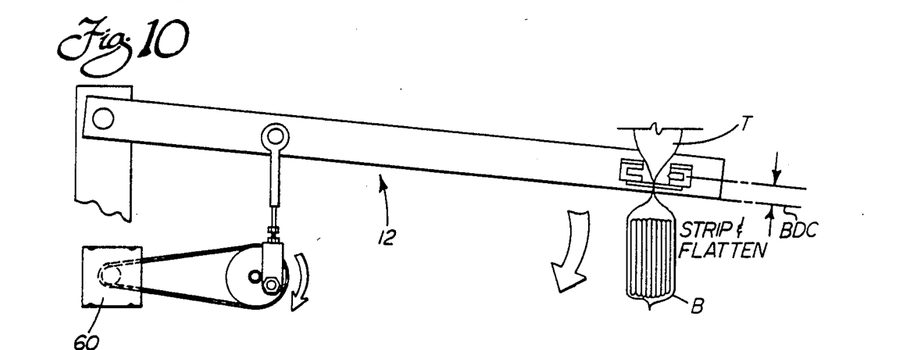

FIG. 10 illustrates the position of the sealing jaws 30, 32 where the stripper plates 34, 35 are brought into full engagement and strip the product down into the bag B by moving toward BDC. The servo motor 61 activation responds to the controller 58, as shown by the action arrow.

Figure 11:
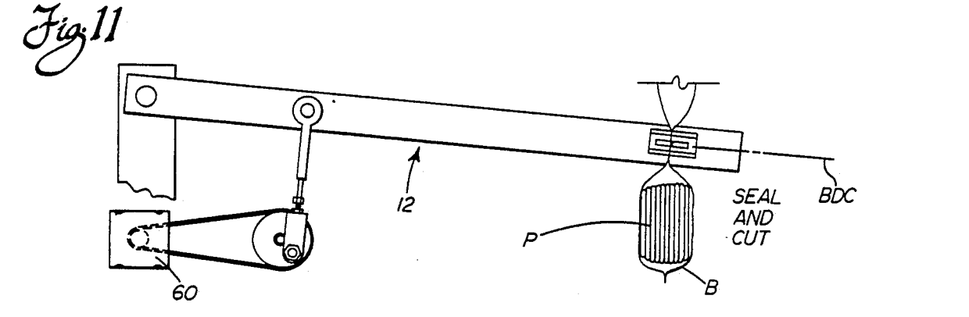

In FIG. 11, the servo motor 60 brings the carriage 12 to the full lowered position (BDC). Here the stripping is complete and the sealing jaws 30, 32 are fully closed for sealing and cutting. FIG. 11 substantially corresponds to FIG. 4 above.

Figure 12:
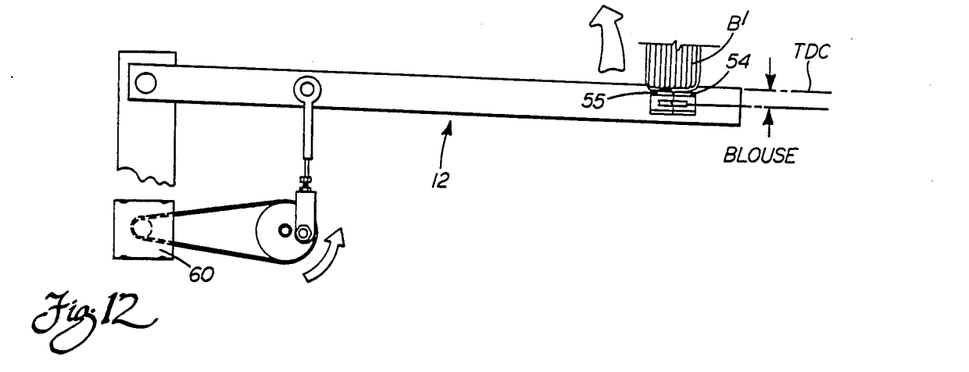

In FIG. 12, the bag B is cut and released (see FIG. 7 above) and the servo motor 60 is now activated in the opposite direction to move the carriage 12 toward its uppermost or home position (see Action Arrow). The jaws 30, 32 are shown just below top dead center with the next bag B' being formed with the product dropping in position. A comparison of FIG. 11 and FIG. 12 again illustrates the manner in which the bottom of the next bag B' is opened for receipt of the product P; bottom of the bag being positioned on top of the blousing plates 54, 55.

The outstanding results and advantages of the present combination invention over the prior patents cited, should now be apparent. The combined blousing/stripping and sealing apparatus, and related method, extends the capability for increased speed, as well as efficiency. The servo motors 50, 60 are precisely controlled by signals generated from external signals supplied to the programmable index controller 58 indicative of the selected bag size being packaged. These controlled movements are further precisely coordinated with the film feeder 70. The use of servo motors 50, 60 eliminates mechanical actuators and linkage providing attractive manufacturing cost savings. Furthermore, efficiency and reliability are enhanced since the servo motors 50, 60 are very energy efficient and rugged in design.

Utilization of the servo motor 60 for driving the carriage 12 is of special significance to allow programmed control of the stripping/sealing functions. By specifying the bag size being packaged, significant compression of the cycle time is available to compliment the time compression advantages resulting from the operation of the sealing jaws 30, 32 by the companion servo motor 50. Controlling of both motors 50, 60 by the same programmable index controller 58 adds an additional significant step to reach the optimum speed and efficiency of the overall packaging operation.

Further complimenting the carriage and sealing jaw operation, is the provision for blousing of the bags B, B' on the upstroke of the carriage. This additional feature assures easy filling of the bag as the bottom is bloused open by resting on the blousing plates 54, 55. There is no delay necessary for settling of the product and additional apparatus, such as vibrating product settling devices are no longer needed. This concept of free blousing of the bag (i.e. without internal mandrels) also serves to simplify the structure required and thus add additional efficiency to the operation.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principals of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

We claim:

1. A combined blousing, stripping and sealing apparatus for use in packaging product in a bag formed from a continuous film tube in a form, fill and seal packaging machine, comprising:
   a carriage,
   means for driving said carriage in a longitudinal direction along said tube;
   sealing jaw means mounted on said carriage for movement between closed and open positions;
   blousing means on said sealing jaw means for bulging the sides of the bag to assist in receiving the product;
   stripping means on said sealing jaw means for stripping to product prior to sealing;
   means mounted on said carriage and connected to said sealing jaw means for selectively moving said sealing jaw means in a first direction toward the closed position for blousing, stripping and sealing, and moving said sealing jaw means in a second direction toward the open position to release the formed bag; and
   control means for said driving means and said moving means, said control means being programmable according to the bag size being packaged, including both the filled bag thickness and length, and including means responsive to said control means for varying both in-and-out as well as up-and-down longitudinal movement of the sealing jaws;
   whereby said blousing, stripping and sealing are performed in a precise manner to both move and stop according to bag size to maximize packaging machine speed.

2. The combined blousing, stripping and sealing apparatus of claim 1, wherein said driving means for said carriage comprises:
   a servo motor;
   crank means coupled for oscillating movement in response to the motor; and
   drive linkage connecting said crank means to said carriage to provide the longitudinal movement along the tube for blousing of the bag upon movement of the carriage opposite to that of bag forming, and stripping of the bag upon movement in the direction for bag forming.

3. The combined blousing, stripping and sealing apparatus of claim 1, wherein said driving means for said carriage comprises:
   a servo motor; and
   said control means including a programmable controller for said motor to provide the precise movement required.

4. The combined blousing, stripping and sealing apparatus of claim 3, wherein said driving means for said carriage further comprises:
   an oscillating crank coupled to the motor by a drive belt; and
   a connecting rod connected between said crank and said carriage to provide the driving of said carriage.

5. The combined blousing, stripping and sealing apparatus of claim 1, wherein said blousing means comprises a pair of plates on said sealing jaws for contact with the bottom of the bag to bulge the sides of the bag by substantially freely lifting the bag during the packaging operation.

6. The combined blousing, stripping and sealing apparatus of claim 1, wherein said control means is operative to generate a signal for driving said carriage in dependence on an external signal indicative of the selected bag size being packaged.

7. The combined stripping and sealing apparatus of claim 6, wherein
   said driving means includes a servo motor and a crank means mounted for oscillating movement in response to said servo motor; and
   drive linkage connecting said crank means to said carriage to provide the movement alternately in the direction opposite to bag forming and in the direction of bag forming.

8. A combined stripping and sealing apparatus for use in packaging product in a bag formed from a continuous film tube in a form, fill and seal packaging machine, comprising:
   a carriage;
   means for driving said carriage in a longitudinal direction along said tube;
   sealing jaw means mounted on said carriage for movement between closed and open positions;
   stripping means on said sealing jaw means for stripping the product prior to sealing;
   means mounted on said carriage and connecting to said sealing jaw means for selectively moving said sealing jaw means in a first direction toward the closed position for stripping and sealing, and moving said sealing jaw means in a second direction toward the open position to release the formed bag; and
   control means for said driving means programmable according to the bag size being packaged, including both the filled bag thickness and length, and including means responsive to said control means for varying both in-and-out as well as up-and-down longitudinal movement of the sealing jaws;

whereby said stripping and sealing is performed in a precise manner to both move and stop according to bag size to maximize packaging machine speed.

9. The combined stripping and sealing apparatus of claim 8, wherein said control means is operative to generate a signal for driving said carriage in dependence on an external signal indicative of the selected bag size being packaged.

10. The sealing apparatus of claim 9, wherein:
said driving means includes a servo motor and crank means mounted for oscillating movement in response to said servo motor; and
drive linkage connecting said crank means to said carriage to provide the movement alternately in the direction opposite to bag forming and in the direction of bag forming.

11. A sealing apparatus for use in packaging product in a bag formed from a continuous film tube in a form, fill and seal packaging machine, comprising:
a carriage;
means for driving said carriage in a longitudinal direction along said tube;
sealing jaw means mounted on said carriage for movement between closed and open positions;
means mounted on said carriage and connecting to said sealing jaw means for selectively moving said sealing jaw means in a first direction toward the closed position for sealing, and moving said sealing jaw means in a second direction toward the open position to release the formed bag; and
control means for said driving means and said moving means programmable according to the bag size being packaged, including both the filled bag thickness and length, and including means responsive to said control means for varying both in-and-out as well as up-and-down longitudinal movement of the sealing jaws; whereby said sealing is performed in a precise manner according to bag size to maximize packaging machine speed.

12. The combined stripping and sealing apparatus of claim 11, wherein said control means is operative to generate a signal for driving said carriage in dependence on an external signal indicative of the selected bag size being packaged.

13. A method of stripping and sealing of a bag to be filled with product and formed from a continuous film tube in a form, fill and seal packaging operation comprising the steps of:
feeding a length of film corresponding to the bag length between a pair of strippers and sealing jaws;
driving said strippers and sealing jaws in a longitudinal direction along the length of the bag being formed;
moving said strippers and sealing jaws in a first direction toward the closed position to engage the strippers on opposite sides of the film;
stopping the movement in the stripping position; driving the strippers and sealing jaws in the direction of bag forming to provide the stripping action; continuing to move said sealing jaws in the first direction to the closed position for sealing and forming said bag; cutting the bag to allow release;
moving said strippers and sealing jaw in a second direction toward the open position to release the formed bag;
driving said strippers and sealing jaws in the direction opposite to that of bag forming to return to the home position; and
controlling the in-and-out movement of said strippers and sealing jaws and the up-and-down longitudinal driving of the same in accordance with the bag size being formed including both the filled bag thickness and length;
whereby the strippers and sealing jaws are operated in a precise manner to drive along the film and move toward and away therefrom according to the selected bag size to maximize the speed of the packaging operation.

14. The method of stripping and bag sealing recited in claim 13, wherein the step of feeding the film is precisely controlled according to the bag size being packaged and in cooperation with the driving and movement of the strippers and sealing jaws during the packaging operation.

15. A method of stripping and sealing of a bag to be filled with product and formed from a continuous film tube in a form, fill and seal packaging operation, comprising the steps of:
feeding a length of film corresponding to the bag length between a pair of strippers and sealing jaws, said feeding being precisely controlled according to the bag size being packaged and in cooperation with the driving and movement of the strippers and sealing jaws during the packaging operation;
driving said strippers and sealing jaws in a longitudinal direction along the length of the bag being formed;
moving said strippers and sealing jaws in a first direction toward the closed position to engage the strippers on opposite sides of the film;
stopping the movement in the stripping position; driving the strippers and sealing jaws in the direction of bag forming to provide the stripping action; continuing to move said sealing jaws in the first direction to the closed position for sealing and forming said bag; cutting the bag to allow release;
moving said strippers and sealing jaw in a second direction toward the open position to release the formed bag;
blousing the bag being formed during driving of said stripper jaws in the direction opposite to that of bag forming and prior to returning to the home position;
controlling the movement of said strippers and sealing jaws and the longitudinal driving of the same in accordance with the bag size being formed;
whereby the strippers and sealing jaws are operated in a precise manner to drive along the film and move toward and away therefrom according to the selected bag size to maximize the speed of the packaging operation.

16. A method of forming a bag to have top and bottom seals in a form, fill and seal packaging operation and blousing the bag while partially formed to facilitate filling with product, comprising the steps of:
forming a continuous film tube;
sealing across said tube by engaging said tube with opposed sealing jaws to provide the partially formed bag including the bottom seal;
freely lifting the tube adjacent the bottom seal of the bag to relax the film and blouse the bag by moving the sealing jaws in a direction opposite to that of bag forming;

holding the bag in the bloused position during filling;
releasing said bag and forming the top seal to complete the bag;
whereby the bottom of the bag is securely held during the lifting step and blousing is facilitated by engaging the top of the sealing jaws so that hard-to-fill product readily enters the bag to maximize packaging speed and prevent puncturing of the bag.

17. The method of bag forming in a form, fill and seal packaging operation of claim 16, wherein is provided the additional step of stripping said film tube in the direction for bag forming prior to forming the seals;

the length of stripping movement in the direction of bag forming being substantially the same as the lifting movement in the direction opposite to that of bag forming; and controlling the length of stripping and lifting in accordance with the bag size in order to maximize packaging speed.

* * * * *